July 16, 1940.  C. S. SCHOENECKE  2,207,898
PRESSURE GAUGE TESTER
Filed Sept. 26, 1938
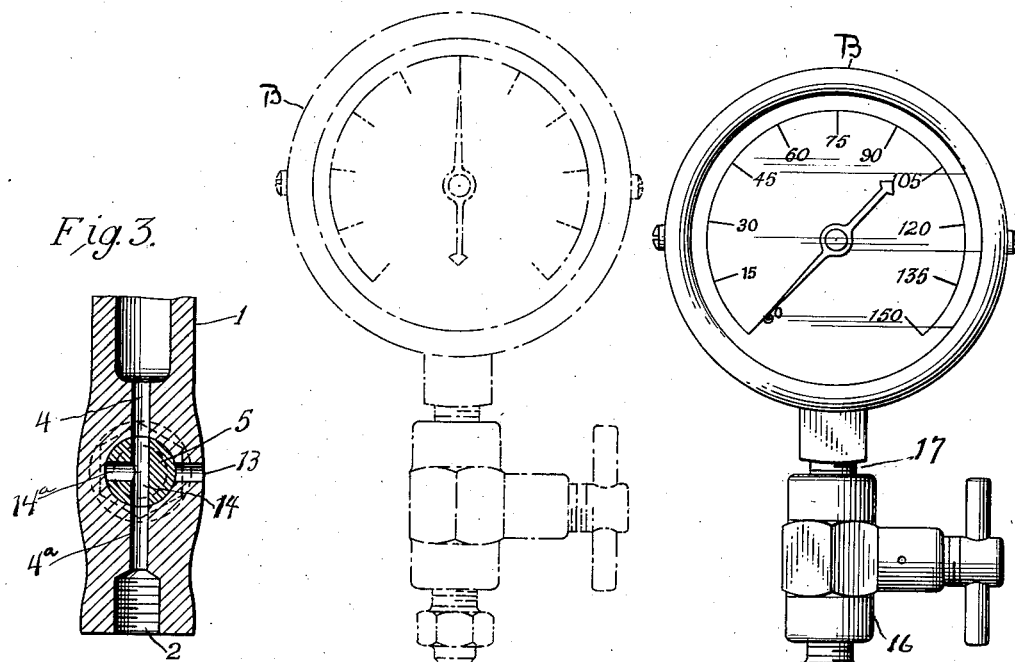
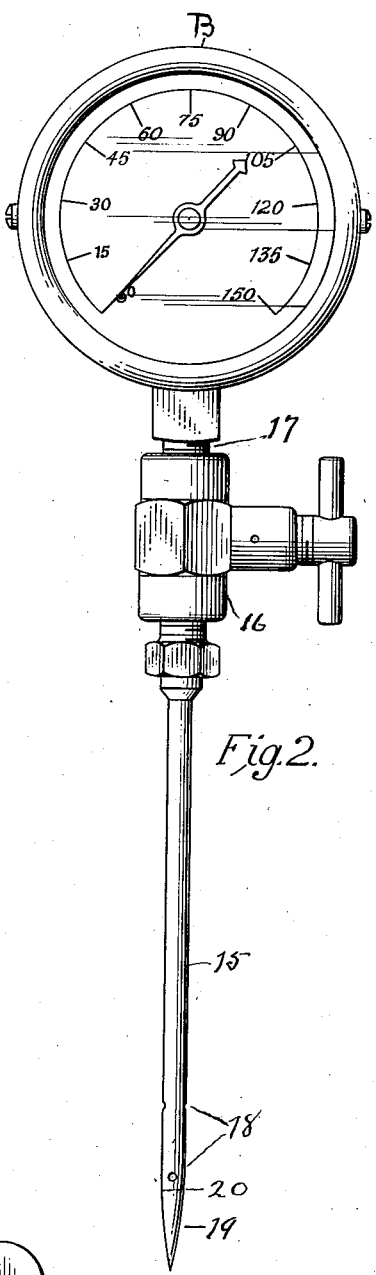
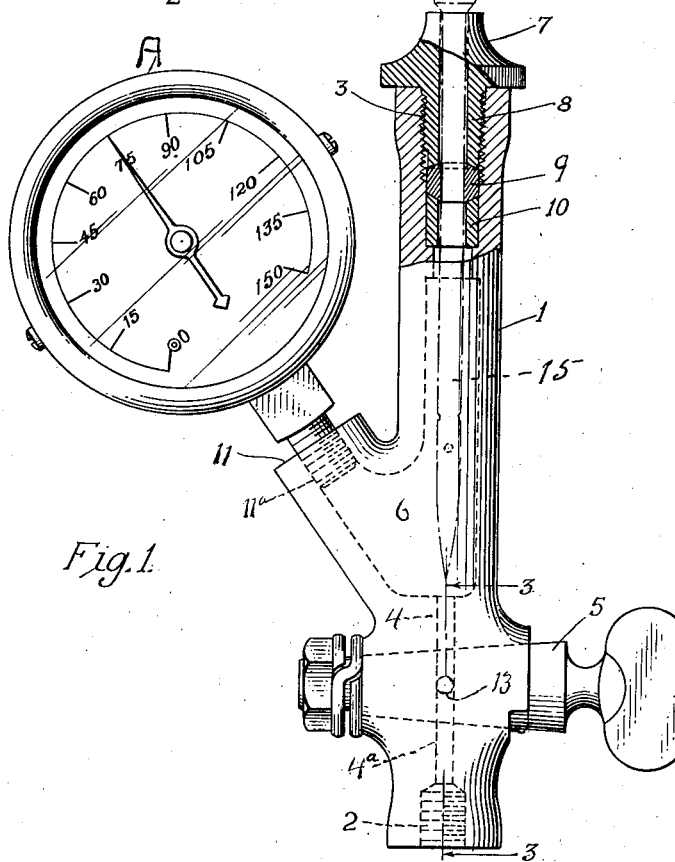
Inventor:
Charles S. Schoenecke
By Winfield Williams
Attorney Patented July 16, 1940

2,207,898

UNITED STATES PATENT OFFICE 2,207,898

PRESSURE GAUGE TESTER

Charles S. Schoenecke, Chicago, Ill.

Application September 26, 1938, Serial No. 231,619

7 Claims. (Cl. 73—51)

My invention is a pressure gauge tester.

My primary object is a device for testing the accuracy of gauges such as are used in the testing carbon dioxide gas volume in the bottling of various liquids, or beverages.

A further object is a simple, economical, accurate, and efficient instrument for the purposes intended.

As an illustration, in the bottling of beverages which contain gas such as carbon dioxide it is necessary at frequent intervals to make test of the gas pressure in the unit bottle to insure practical uniformity therein. In this process a primary gauge, which forms part of the ordinary mechanism, gradually becomes inaccurate by reason of its repeated application to the individual bottle, necessitating periodic testing of the primary gauge in comparison with a master gauge maintained at a fixed standard.

The attached drawing illustrates an embodiment of my invention, in which—

Fig. 1 is an elevation of my device with a section cut away.

Fig. 2 is an elevation of a type of regular primary testing mechanism.

Fig. 3 is a sectional view taken along lines 3—3 of Fig. 1, showing the arrangement of a valve in my gauge testing mechanism.

As illustrated, I is a substantially cylindrical body having at one end a threaded bore 2 leading to a restricted channel 4 which itself opens into a chamber 6. A threaded bore 3 in the opposite end of the body I leads to the chamber 6, and in this end there is a packing nut assembly 7 with a threaded portion 8 seated in the bore 3 there being an elastic compressible member 9 assembled between the packing nut portion 8 and a countersunk bushing 10 in the bore 3. 5 is a valve seated in an enlargement of the body I adjacent to the threaded opening 2. A lateral extension 11 of the body I has a threaded bore 11a which leads to the chamber 6 which bore is adapted to receive and support a threaded portion of a master gauge A. A port 13 leads from one side of the body enlargement to the valve 5 and is adapted to register with channel 14 in the valve 5 when in a certain position. Valve 5 has a three-way channel consisting of a main channel 14 and a tributary channel 14a, so adapted that when valve 5 is given a quarter turn the tributary channel 14a registers with the upper portion of channel 4 and one end of channel 14 registers with port 13 closing any connection with 4a below the valve.

A hollow steel plunger needle 15 is threadedly seated in a snift valve 16 in one side and a gauge B is inserted at 17. This steel plunger needle has openings 18 transverse thereof slightly spaced from a punching end; there being a sharp pointed removable end portion 19 for piercing the bottle closure seated in 15 at 20.

The operation of my device is as follows: The device in Fig. 1 is threadedly attached to a vessel containing a quantity of gas, the valve 5 being in the position shown in Fig. 3. Then the device shown in Fig. 2 is inserted in thru the packing nut 7 and thru the elastic gasket 9 until the plunger 15 is in the chamber 6. Opening the regular valve on the vessel containing gas the gas passes into the chamber 6, into the master gauge A, and up into the primary gauge B. If the gauge B differs in its indicator from the indicator in gauge A the valve 5 is turned a quarter way until the 14a portion of the valve 5 registers with the upper channel 4 leading into chamber 6 whence the gas in said chamber exhausts outwardly. The gauge B being readjusted the valve 5 is returned to its initial position whence the incoming gas will again test the accuracy of gauge B in comparison with the master gauge A. This operation will be repeated until gauge B indicates the same pressure as gauge A.

I do not limit myself to the device illustrated except in so far as I am limited by the scope of my claims.

I claim:

1. In a device for the purposes described an elongated tubular body having a three-way valve assemblage adjacent to and transverse of one end; a stuffing box combination consisting of a packing nut, a compressible member, and a bushing in the opposite end; an elongated pressure chamber between the valve housing and the stuffing box means having an opening for the installation of a master gauge; a restricted channel extending from the pressure chamber transversely across the valve housing to an opening for pressure connection; and an aperture in the wall of the valve seat adapted to register with one way of the three-way valve at a predetermined position to open the pressure chamber to the outside atmosphere on closing of the valve to the pressure connection.

2. In a device for the purposes described a substantially cylindrical body having a threaded inlet at one end and a gas sealing means at the opposite end adapted to receive sealingly a gas tight member of a gas pressure testing instrument and enclose an elongated chamber, spaced from the threaded end a valve housing transverse of the cylinder body, a three-way apertured valve seated therein one aperture adapted to register with a restricted channel connecting the inlet opening and the chamber, an aperture in the wall of the valve housing adapted to register with a branch of the channel in the valve, and an opening in the wall of the chamber to support a master gauge.

3. In a device for testing a pressure gauge having an elongated tubular puncturing needle, an elongated tubular body having a three-way valve assembly transverse of and adjacent to one end opening and an offset opening spacedly adjacent the valve assembly, a stuffing box assembly in the opposite end opening adapted to receive the puncturing needle, a chamber substantially central of the body communicating with the openings at either end and the offset opening, a port in the wall of the valve housing adapted to register with a channel in the valve when the valve is turned to a position to close off pressure from the primary source of pressure and connect directly with the chamber.

4. In a device for the purposes described an elongated tubular body carrying a transverse enlargement adjacent one end and a lateral opening spacedly adjacent to the transverse enlargement, a chamber substantially central of the tubular body having channels leading thereto from either end and from the lateral opening, a valve assembled in the transverse enlargement, means in the end opposite to the valve to compressingly receive and support a member of a testing gauge assembly, and a port in the wall of the transverse enlargement adapted to register with one channel of a three-way channel in the valve.

5. In a device for testing a primary testing gauge wherein the gauge is equipped with an elongated hollow needle adapted to insertion into a liquid container charged with gas, an elongated tubular body having at one end an automatic gas sealing means for receiving the needle, a valve transverse of and adjacent to the opposite end having a three-way restricted channel therethru, a chamber there-between, a port in the wall of the tubular body adjacent the valve adapted to register with the three-way channel in one position of the valve, a means for operatively associating the elongated tubular body with a source of pressure, and means for attaching to the chamber of the device a master gauge.

6. In a device for testing a pressure gauge having an elongated tubular puncturing needle, an elongated tubular chamber having at one end thereof means to sealingly receive the tubular puncturing needle in the elongated chamber, adjacent the other end of the said chamber a valve transverse thereof including a three-way channel, one of said channels adapted to register with an outlet aperture in the wall of the tubular chamber, means to operatively associate a master gauge with the tubular chamber, and means to attach the device to a primary source of pressure.

7. In a testing device an elongated substantially tubular member having in one end means to connect with a primary source of pressure, the other end containing resilient means to sealingly enclose in the chamber of the tubular member an elongated hollow member of a testing gauge, a valve including a three-way channel therein seated transverse of the tubular member and adjacent to the means connecting with the primary source of pressure, there being a port in the wall of the valve seat adapted to register in one position with a port of the three-way channel and thereby simultaneously close the channel from the primary source of pressure and releasing the pressure on the gauge, and means for maintaining connection of a master gauge with the pressure chamber.

CHARLES S. SCHOENECKE.